US012420874B2

(12) United States Patent
Facchinello et al.

(10) Patent No.: US 12,420,874 B2
(45) Date of Patent: Sep. 23, 2025

(54) MODULAR TRUCK CAP APPARATUS

(71) Applicant: Extang Corporation, Ann Arbor, MI (US)

(72) Inventors: Jerome Facchinello, Grand Blanc, MI (US); Robert Mosingo, Saline, MI (US); Chad Carter, Manchester, MI (US); Anthony Becker, Saline, MI (US); Robert Wisely, Saline, MI (US); Daniel Delaney, Pinckney, MI (US)

(73) Assignee: Extang Corporation, Ann Arbor, MI (US)

( * ) Notice: Subject to any disclaimer, the term of this patent is extended or adjusted under 35 U.S.C. 154(b) by 319 days.

(21) Appl. No.: 17/968,094

(22) Filed: Oct. 18, 2022

(65) Prior Publication Data

US 2023/0373570 A1    Nov. 23, 2023

Related U.S. Application Data

(63) Continuation-in-part of application No. 17/749,210, filed on May 20, 2022, now Pat. No. 12,017,519.

(51) Int. Cl.
*B62D 33/04* (2006.01)
*B60J 7/16* (2006.01)

(52) U.S. Cl.
CPC ............. *B62D 33/04* (2013.01); *B60J 7/1607* (2013.01)

(58) Field of Classification Search
CPC . B60J 7/1607; B60J 7/141; B60J 7/106; B60J 7/102; B60J 7/1614; B60J 7/042; B60J 7/041; B60J 7/022; B60J 7/11; B60J 7/024; B60J 7/1851; B60J 7/1853; B60J 7/1858; B60J 7/194; B62D 33/04;
(Continued)

(56) References Cited

U.S. PATENT DOCUMENTS

| 2,893,780 A | 7/1959 | Ervine |
| 3,021,170 A | 2/1962 | Cornelius |

(Continued)

FOREIGN PATENT DOCUMENTS

KR    960021680 A    7/1996

OTHER PUBLICATIONS

Nutzo—Gladiator Cab Height/Tire Shelf Compatible product, last accessed on May 16, 2022 via https://nuthouseindustries.com/shop/racks/Jeep-gladiator-racks/nutzo-gladiator-cab-height-tire-shelf-compatible/.

(Continued)

*Primary Examiner* — Amy R Weisberg
*Assistant Examiner* — Wenwei Zhuo

(57) ABSTRACT

A utility rack for covering at least a portion of a cargo area of a vehicle, the utility rack includes a frame having: one or more lower support bars that are configured to extend at least partially along a length of the cargo area; one or more upper support bars that are configured to extend at least partially along the length of the cargo area; and one or more pillars extending between the one or more lower support bars and the upper support bars; wherein in a first configuration of the frame, the one or more pillars are connected to inner surfaces of the one or more lower support bars and the one or more upper support bars; and in a second configuration, the one or more pillars are connected to outer surfaces of the one or more lower support bars and the one or more upper support bars.

16 Claims, 11 Drawing Sheets

(58) Field of Classification Search
CPC ..... B62D 33/0207; B62D 33/046; B60P 7/02; B60P 3/34; B60R 5/003; B60R 5/044; B60R 9/02; B60R 11/06
USPC ...... 296/100.02, 100.17, 136.03, 165, 185.1, 296/136, 12, 193.06, 24.4, 4, 3, 37.6, 296/171, 175, 26.04, 26.05, 26.06, 26.07, 296/136.12
See application file for complete search history.

(56) References Cited

U.S. PATENT DOCUMENTS

| | | |
|---|---|---|
| 3,050,335 A | 8/1962 | Schubach |
| 3,819,223 A | 6/1974 | Cobb et al. |
| 4,448,453 A | 5/1984 | Irelan et al. |
| 4,738,274 A | 4/1988 | Heath |
| 5,056,855 A | 10/1991 | Moravsky |
| 5,344,159 A | 9/1994 | Powell |
| 6,086,134 A | 7/2000 | Cravens |
| 9,440,520 B2 | 9/2016 | Rohr et al. |
| 10,272,754 B2 | 4/2019 | Johnson |
| 10,746,218 B2 | 8/2020 | Huet et al. |
| 10,760,295 B2 | 9/2020 | Attema |
| 11,376,932 B2 | 7/2022 | Barnwell |
| 2009/0102227 A1 | 4/2009 | Herndon |
| 2010/0201154 A1 | 8/2010 | Kramer |
| 2016/0059906 A1* | 3/2016 | Leitner ............. B62D 33/0207 296/3 |
| 2017/0349032 A1 | 12/2017 | Lewis et al. |
| 2019/0329638 A1 | 10/2019 | Willard et al. |
| 2020/0031211 A1 | 1/2020 | Singer |
| 2021/0078645 A1* | 3/2021 | Hanson ................. B62D 43/06 |
| 2021/0129643 A1 | 5/2021 | Voss |
| 2021/0129734 A1* | 5/2021 | Petty ......................... B60R 9/00 |
| 2022/0105994 A1* | 4/2022 | Roberson ........... B62D 33/0207 |
| 2022/0314892 A1* | 10/2022 | Engelke ................. B60K 15/06 |
| 2022/0348269 A1* | 11/2022 | Flores ................ B62D 33/0207 |
| 2023/0028850 A1 | 1/2023 | Young |
| 2023/0406078 A1 | 12/2023 | Facchinello et al. |

OTHER PUBLICATIONS

Examiners Report Dated Nov. 21, 2023, for Canadian Application 3,167,868.
Co-pending U.S. Appl. No. 17/749,210, filed May 20, 2022.

* cited by examiner

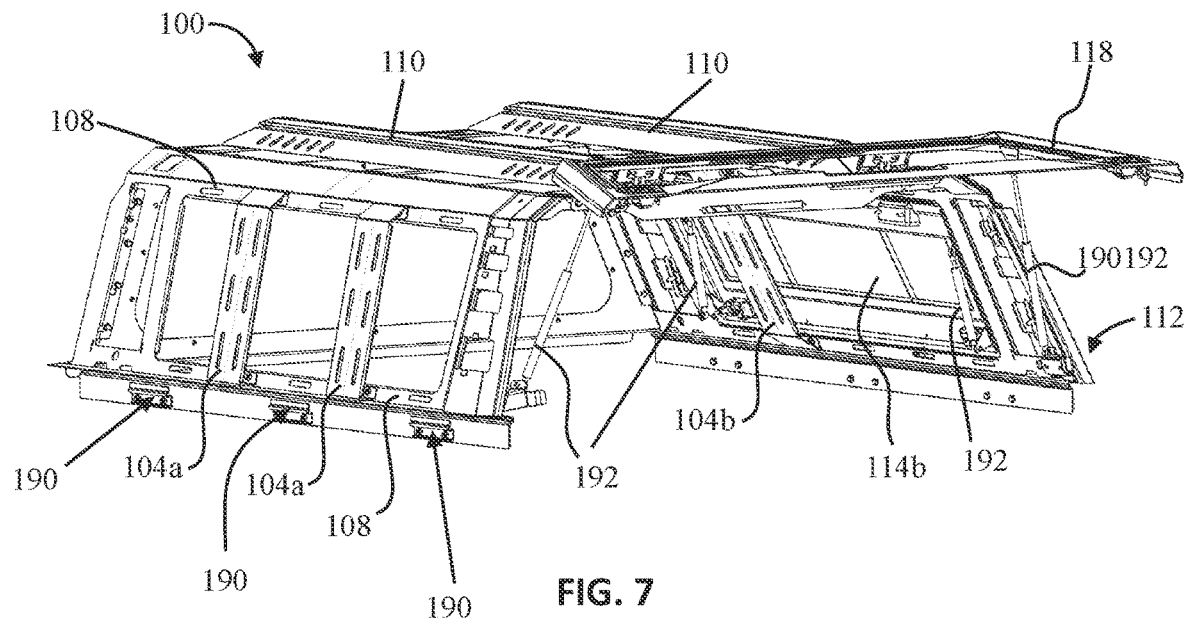
FIG. 7
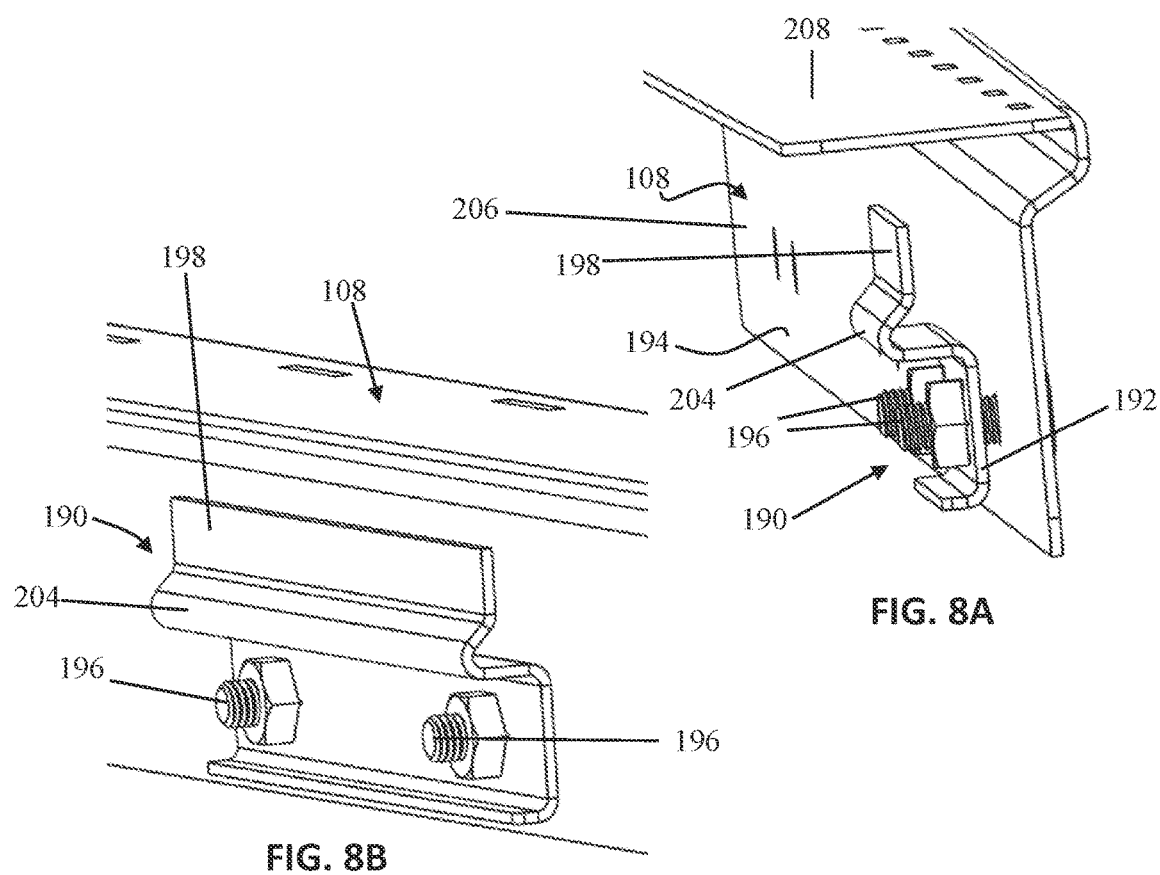
FIG. 8A
FIG. 8B

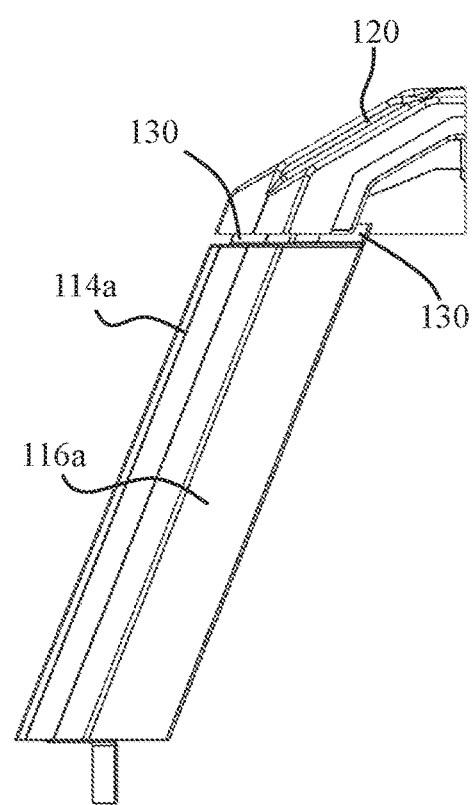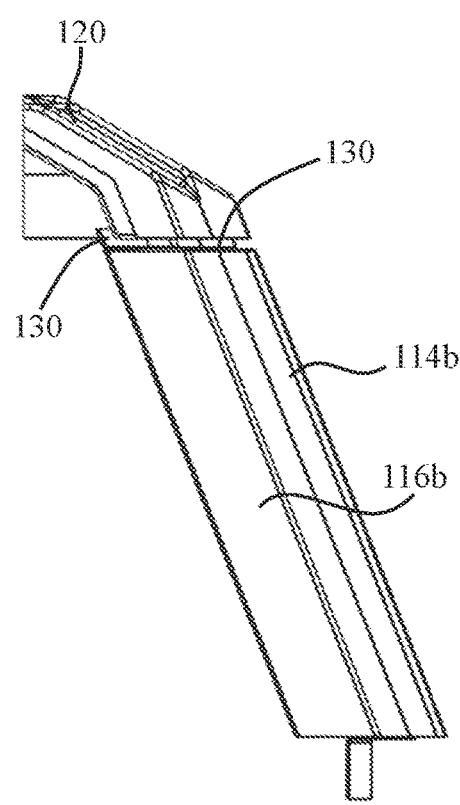
FIG. 9A　　　　　　　　　　　　　　　　　FIG. 9B

MODULAR TRUCK CAP APPARATUS

PRIORITY

This application claims the benefit of U.S. Ser. No. 17/749,210 filed on May 20, 2022, the entire contents of which is hereby incorporated by reference herein for all purposes.

FIELD

These teachings relate to a vehicle cover, and more specifically to an apparatus having a frame onto which one or more panels can be attached and detached.

BACKGROUND

A truck cap may be used to cover the cargo area of a pickup truck to prevent fluids and/or debris from entering the cargo area. Some traditional truck caps are difficult to install and uninstall from a pickup truck. Some traditional truck caps are bulky and expensive to ship and occupy a lot of space in storage. Some traditional truck caps limit the amount and/or size of goods that may be stored and/or transported in the cargo area of a vehicle. Accordingly, it may be desirable to have an apparatus that may overcome at least some of these deficiencies.

For example, it may be desirable to have a truck cap that can be quickly and easily installed on and uninstalled from a vehicle. It may be desirable to have a truck cap that can be shipped in one or more boxes and/or easily stored when not in use. It may be desirable to have a truck cap that has one or more panels that can be removed from a frame, to allow for larger or additional goods to be stored or transported in the cargo area of the vehicle. It may be desirable to have a truck cap having one or more panels that can be quickly installed onto a frame, to quickly and easily enclose a cargo area of the vehicle to present fluids and/or debris from entering the cargo area. It may be desirable to have a truck cap with one or more panels that can be quickly removed from a frame, to provide an open-air truck cap and/or so that other items, such as tools or accessories, can be mounted or attached to the frame.

SUMMARY

These teachings provide a truck cap. The apparatus or truck cap can be quickly and easily assembled and/or installed on a vehicle. The apparatus or truck cap can be quickly and easily disassembled and/or uninstalled on a vehicle. The apparatus or truck cap that can be shipped in one or more boxes and/or easily stored when not in use. The apparatus or truck cap has one or more panels that can be removed from a frame, to allow for larger or additional goods to be stored or transported in the cargo area of the vehicle. The apparatus or truck cap has one or more panels that can be quickly installed onto a frame, to enclose a cargo area of the vehicle to quickly and easily to prevent fluids and/or debris from entering the cargo area. The apparatus or truck cap has one or more panels that can be quickly removed from a frame, to provide an open-air truck cap. Open air truck cap means that the interior of the cargo area is exposed to the environment. By removing one or more panels from the frame, other items, such as tools, shovels, gas cans, jacks, tires, ladders, or other accessories, can be mounted or attached to the frame.

An apparatus for covering at least a portion of a cargo area of a vehicle is provided. The apparatus includes a frame; one or more side panels attached to the frame; one or more quarter panels attached to the frame; a rear panel; a roof panel supported by the frame; and a lifting mechanism configured to reposition the roof panel relative to the frame and/or the one or more side panels. The lifting mechanism has a handle, a rotary part connected to the handle, a lifter, and a track supporting the lifter. Movement of the handle causes the track to move in a first direction, which causes the lifter to slide in the track in a second direction to raise and/or lower the lifter, which causes the roof panel to be repositioned.

BRIEF DESCRIPTION OF THE DRAWINGS

FIG. 7 is a perspective view of the apparatus.

FIG. 8A is a partial perspective view of a portion of the frame.

FIG. 8B is a partial perspective view of a portion of the frame.

FIG. 9A is a partial side view the top panel and the quarter panel.

FIG. 9B is a partial side view the top panel and the quarter panel.

DETAILED DESCRIPTION

Figure 1:
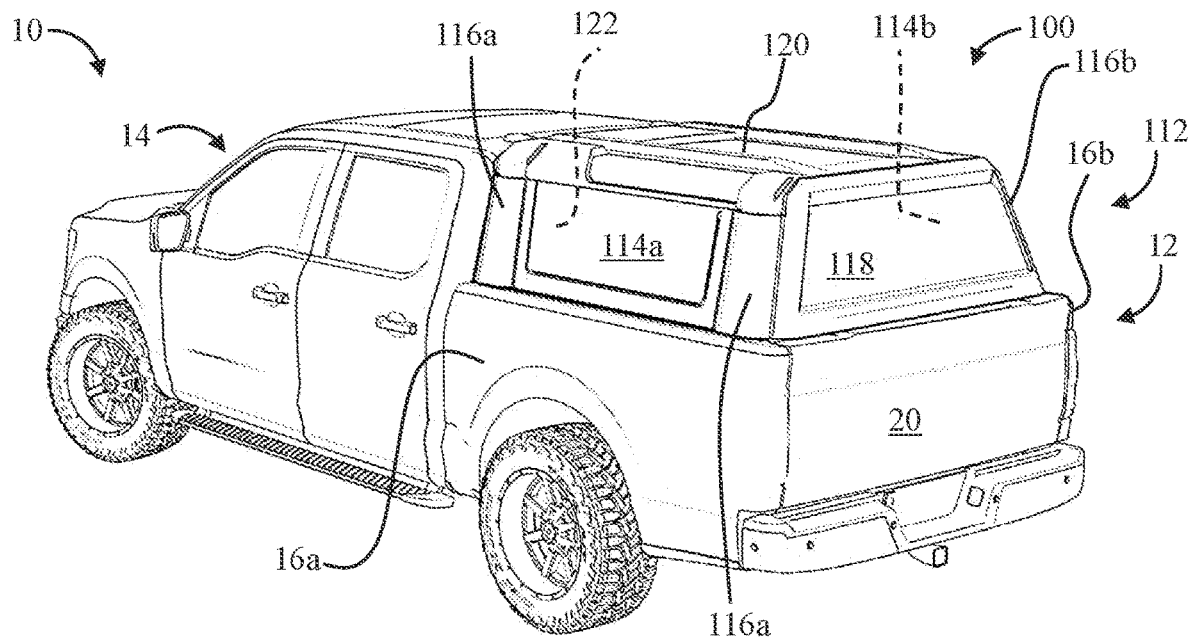
FIG. 1 is a perspective view of a vehicle and the apparatus according to these teachings, which includes a frame and one or more panels attached to the frame.
Figure 2:
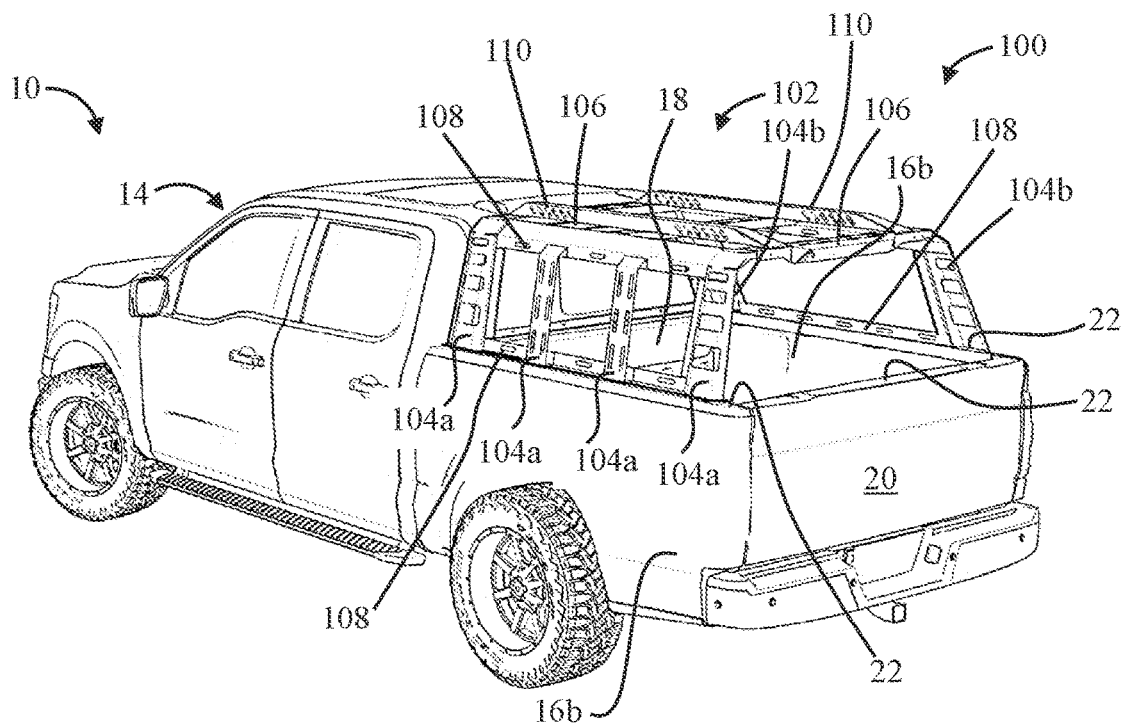
FIG. 2 is a perspective view of a vehicle and the frame of the apparatus.
Figure 3:
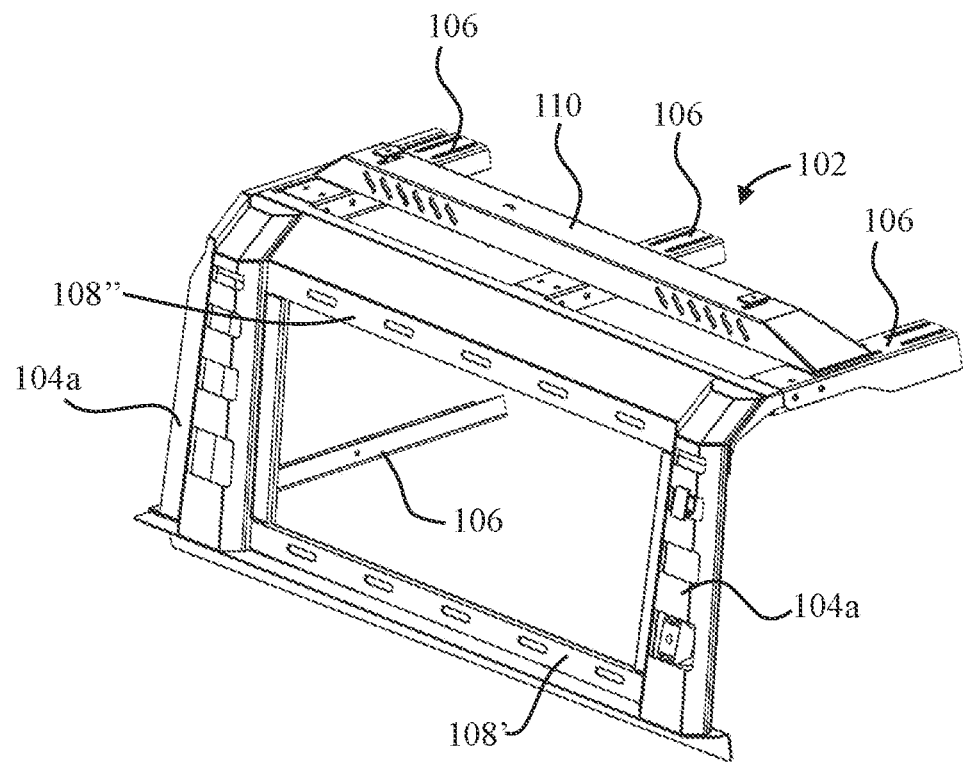
FIG. 3 is a partial perspective view of the frame.

A vehicle 10 is illustrated in FIGS. 1 and 2. The illustrated vehicle 10 is a pickup truck. However, the vehicle 10 may be any vehicle 10. The vehicle 10 may have a bed or cargo area 12. The vehicle 10 may include a passenger area or cab 14, which may include an area and/or one or more seats for one or more occupants to sit in while operating the vehicle 10.

The cargo area 12 may be defined by a plurality of walls that include: opposing side walls 16a, 16b, a front wall 18 located adjacent the passenger cab 14, and a rear wall or tailgate 20 that opposes the front wall 18. Each of the walls 16a, 16b, 18, 20 may include a top surface 22 and an inwardly facing inside surface defining the inside of the cargo area 12. The cargo area 12 has a bottom or floor that is surrounded by the walls 16a, 16b, 18, 20. The bottom or floor is opposite the open end or top of the cargo area 12.

The front wall 18 of the cargo area 12 may be a shared or common wall with a rear wall of the passenger cab 14. Such vehicles may be a one piece or a uni-body vehicle. In other vehicles, the front wall 18 may be a separate wall, segment, or portion of the vehicle from a rear wall of the passenger cab 14. The front wall 18 may also provide access to the passenger cab 14 via a pass through or fold down or roll down wall or door.

An apparatus 100 is also illustrated in FIGS. 1 and 2. The apparatus 100 may be for at least partially covering a portion of the cargo area 12 of the vehicle 10. The apparatus 100 may be, or may be referred to herein as, a cap, a truck cap, a modular truck cap, a topper, an overland cap, an overland cover, an overland knock-down truck cap, an overland rack, a rack, a utility rack, a frame, an assembly, an apparatus, and/or the like.

The apparatus 100 comprises a frame 102. The frame 102 may be attached to, or supported at, on, or by one or more of the walls 16a, 16b, 18, 20 of the vehicle 10 (i.e., on the top surface 22 of one or more of the walls, and/or on the inside surface of one or more of the walls (i.e., interior surface of the cargo area) and/or on the outside surface of the one or more walls (i.e., exterior surface of the vehicle or cargo area) and/or on the bottom or floor of the cargo area 12)).

In the illustrated example, the frame 102 is attached to or supported at, on, or by the side walls 16a, 16b and optionally the front wall 18. It may be advantageous to not attach the frame 102 or apparatus 100 to or on the rear wall or tailgate 20 of the vehicle 10, in order to not obstruct, hinder or restrict movement or operation of the tailgate 20 while the apparatus 100 is installed on the vehicle 10. For example, if the apparatus 100 was fixedly secured to the rear wall or tailgate 20, then a user may not be able to open or lower the tailgate 20. However, in certain configurations, the frame 102 or one or more element of the frame 102 may be attached to or supported at, on, or by the tailgate 20 to lock the tailgate 20 in place and restrict or prevent it from being opened or lowered. In certain configurations, the frame or apparatus may rest on the rear wall but still allow the rear wall to be opened or lowered without being completely obstructed by the frame or apparatus.

The frame 102 may be secured to the one or more walls of the vehicle via one or more fasteners, clamps, brackets, etc. For example, the one or more fasteners, clamps, or brackets may be similar to those traditionally used to secure a truck cap to a vehicle and/or a rail to the bed wall of a vehicle for supporting a tonneau cover. For example, referring to FIGS. 7-8C, brackets are shown that may be used to attach the frame 102 to the side walls of the cargo area.

Referring now to FIGS. 2, 3, 4, 5 and 6, the frame 102 of the apparatus 100 may comprise one or more pillars 104a, 104b. A pillar may also be referred to herein as a pillar bar, a support bar, a bracket, a mounting bracket, mounting pillar, or a combination thereof. A pillar 104a, 104b may be a generally vertical element or support of the frame 102. Pillars 104a may be arranged on the driver's side of the vehicle 10 and pillars 104b may be arranged on the passenger side of the vehicle 10. The apparatus 100 may have the same number of pillars 104a, 104b on each side of the vehicle 10 or cargo area 12, or there may be a different number of pillars 104a, 104b on each side of the vehicle 10 or cargo area 12. Pillars 104a, 104b that are located on the same side of the vehicle 10 or cargo area 12 may be referred to herein as adjacent pillars. Pillars 104a, 104b that oppose one another or are located on opposite sides of the vehicle 10 or cargo area 12 may be referred to herein as opposing pillars. In some configurations, one or more pillars may be located at the front and/or rear end of the frame (i.e., in regions adjacent to the passenger area of the vehicle and/or the tailgate of the vehicle).

Pillars 104a, 104b may be attached to and/or supported at, on, or by frame supports 108. Frame supports 108 are discussed further below, and may also be referred to herein as second supports 108, pillar supports 108, support bars 108 etc. Frame supports or pillar supports or support bars 108 may be generally longitudinal members that extend in a fore-aft (front to back) direction, in vehicle position. Frame supports or pillar supports 108 may extend entirely or only partially between the front wall and rear wall or tailgate of the cargo area. Frame supports or second supports or pillar supports 108 are discussed further below. The one or more pillars 104a, 104b may be attached to and/or supported at, on, or by one or more of the top surface 22 of the walls 16a,b, 18, 20. Additionally, or alternatively, the pillars 104a, 104b may be attached to and/or supported at, on, or by the outside and/or inside surfaces of the walls 16a,b, 18, 20. The pillars 104a, 104b may be attached to the one or more supports 108 and/or walls 16a, 16b, 18, and 20 via one or more fasteners (screws, bolts, etc.), clamps, brackets, etc. such as those commonly used to secure tonneau cover bed rails and/or truck toppers to a cargo area 12 and/or vehicle 10.

Figure 6:
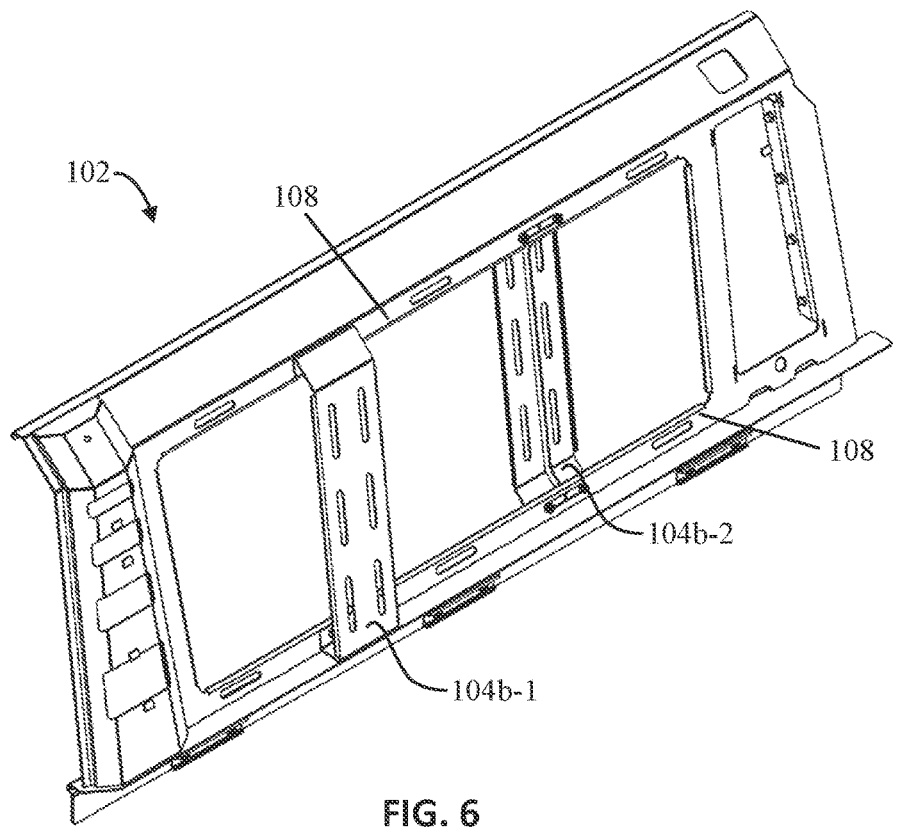
FIG. 6 is a partial perspective view of the frame.

With particular reference to FIG. 6, a pillar 104b-1 may be attached to the outside surface of the frame 102 and/or support 108. A pillar 104b-2 may be attached to an inside surface of the frame 102 and/or support 108. In other words, a pillar 104a and/or 104b may be reversible in the sense that it can be mounted or secured to an outside surface or part of the frame 102 and/or an inside surface or part of the frame 102. A pillar 104a, 104b may be used for providing structural integrity to the frame 102 or apparatus 100. A pillar 104a, 104b may be used for mounting or securing accessories to the frame 102 or apparatus 100. Accordingly, by installing or mounting a pillar 104a, 104b inside of the frame 102 or apparatus 100, a user may be able to mount or secure one or more accessories to an inside region of the frame 102 or apparatus. On the other hand, by mounting a pillar 104a, 104b on the onside of the frame 102 or apparatus 100, a user may be able to mount or secure one or more accessories to an outside of the frame 102 or apparatus 100.

Referring now to FIG. 7, an apparatus 100 is shown with pillars 104a mounted or installed to an outside surface or region of the frame 102 or apparatus or upper and lower support bars 108, and pillar 104b mounted to an inside surface or region of the frame 102 or apparatus 100 or upper and lower support bars 108. Accordingly, accessories may be mounted or attached to an outside of the frame 102 or apparatus 100 at pillars 104a and accessories may be mounted or attached to an inside surface or region of the frame 102 or apparatus at pillars 104b. Of course, a user may include any combination of pillars 104a, 104b attachments, such as pillars 104a attached to the inside and/or outside of the frame 102 and pillars 104b attached to the inside or outside of the frame 102.

The pillars 104a, 104 may be interchangeable. What is meant by interchangeable is that pillar 104a may be attached to the inside region of the frame 102 on the driver's side of the frame 102, removed therefrom, and then installed or attached to the outside region of the frame 102 on the driver side of the frame, or installed or attached to the inside region of the frame 102 on the passenger side of the frame 102, or installed or attached to the outside region of the frame 102 on the passenger side of the frame 102. The same applies to pillar 104b. Furthermore, a pillar 104 located at a forward end or part of the frame 102 (closer to the front wall of the cargo area) may be attached to a rearward part of the frame (closer to the rear wall or tailgate) or vice versa. Having such flexibility in the attachment of the pillars 104 to the frame 102 allows for a user to totally customize the frame 102 for functionality and aesthetics.

The pillars 104a, 104 may include one or more slots, openings, holes, bores, or other connecting features for attaching the pillars to the frame 102 and/or for attaching accessories to the pillars 104a, 104b. Furthermore, the pillars 104a, 104b may include one or more slots, openings, holes, bores, magnets, or other connecting or mounting features for attaching one or more of the panels 112 to the front or back side of the pillars 104.

The frame 102 may include one or more first supports 106. The one or more supports disclosed herein (first supports, second supports, third supports, etc.) may also be referred to herein as a support bar or support bars. First supports 106 may be also referred to as lateral or horizontal supports. A first support 106 may be a generally horizontal element or support component of the frame 102. The first supports 106 or lateral supports may extend in a cross-car direction and/or between opposing pillars 104a and 104b. The first supports 106 may be attached to and/or supported at, on, or by pillars 104a, 104b via one or more fasteners (screws, bolts), clamps, magnets, etc. The first supports 106 may be attached to and/or supported at, on, or by one or more of the walls of the cargo area 12, by the top surface and/or inner surface thereof. In some configurations, a horizontal rail may be attached to one or more walls of the cargo area and the one or more supports 106 may be attached to those rails. As shown best in FIGS. 5 and 9, one or more of the first or lateral supports 106 may have a downwardly turned flange portion 107 and/or an upwardly turned flange portion 107'. The flange portions 107, 107' may assist with attaching, clamping, and/or supporting the frame 102 or supports 106 to the cargo area 12 or vehicle, for example to the inside walls of the cargo area and/or the top sides or surfaces of the side walls of the cargo area of the vehicle.

With continued reference to FIGS. 2-7, the frame 102 may include one or more second supports 108. Second supports 108 may be also referred to as longitudinal supports or support bars. A second support 108 may be a generally horizontal element or support component of the frame 102. The second supports 108 or longitudinal supports 108 may extend in a fore-aft direction between adjacent pillars 104a, 104a or between adjacent pillars 104a, 104b. The support bars may be further defined by lower support bars 108' and opposing upper support bars 108". Pillars 104a, 104b may be attached or secured to the second supports 108 (extend between lower 108' and upper support bars 108") via one or more fasteners, such as bolts, screws, quick connect fasteners, quarter turn fasteners, magnets, hook and loop fasteners, etc. The second supports 108 may be secured to the one or more side walls 16a, 16b via one or more fasteners (bolts, screws) brackets, clamps, such as those commonly used to secure tonneau covers and/or truck toppers to a wall of the cargo area 12 and/or vehicle 10. Of course, in some configurations, the supports 108 may be attached or secured to one or more of the front and rear walls 18, 20.

The apparatus 100 or the frame 102 may include one or more brackets 190. The one or more brackets 190 may be confirmed to attach or secure the apparatus 100 or frame 102 to the vehicle or walls of the cargo area of the vehicle.

Figure 8C:
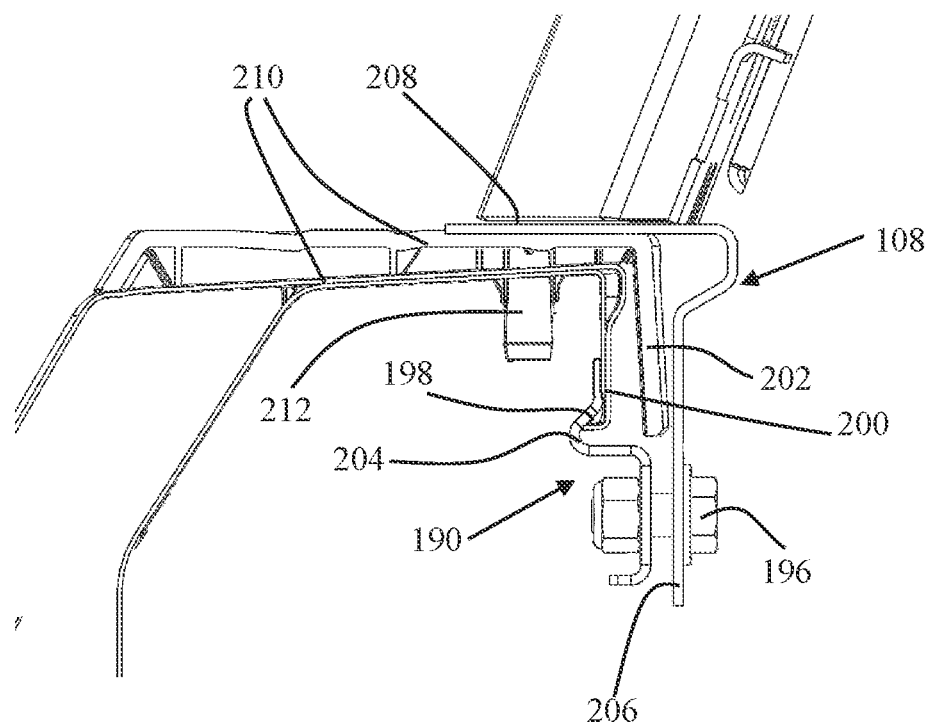
FIG. 8C is a cross-sectional view of the frame engaging a bed wall of a vehicle.

The bracket 190 may include a first portion 192 that is configured to be secured against a planar portion 194 of the second support 108. This first portion 192 may include one or more openings through which a fastener 196 may be received to attach the bracket 190 to the support 108. The first portion 192 may have a U-shaped cross section. The bracket 190 may include a second portion 198 that cantilevers from the first portion 102. The second portion 198 may be configured to squeeze or press a portion of the vehicle or wall of the vehicle between against the support 108, as illustrated in FIG. 8C. That is, to install the frame 102 or support 108, a portion of the flange 200 and/or bed cap 202 of the vehicle 100 or wall 16a, 16b, 18, 20 (FIG. 1, 2) is configured to be received in a gap defined between the second portion 198 of the bracket 190 and the support 108. Then, tightening the fastener(s) 196 causes the gap to reduce in size (i.e., the second portion 198 is moved towards the support 108, thereby clamping or squeezing the flange 200 and/or bed cap 202 of the vehicle between the bracket 190 and the support 108 thereby securing the frame 102 and the apparatus 100 to the vehicle. The bracket 190 may be configured to bend or flex in the curved or bent region 204 upon tightening of the fasteners 196 and clamping or pressing of the flange 200 against the support 108. The bracket 190 may be made of a suitable material, such as metal, aluminum, a plastic, composite, the like, or a combination thereof.

Referring to FIGS. 8A and 8C, the support 108 includes a generally vertical portion 206 against which the flange 200 or bed cap 202 of the vehicle or bed wall is pressed against. The support 108 also includes a generally horizontal potion 208. The generally horizontal portion 208 may be configured to sit on a top surface 210 of the bed wall 16, 18, 20 or bed cap 202. The bed cap 202 may be fastened to the vehicle bed wall 16, 18, 20 via one or more fasteners 212. The top surface 210 may be vehicle sheet metal.

Referring back to FIGS. 2, 3, 4, 5 and 7, the frame 102 may include one or more third supports 110. Third supports 110 may be referred to as longitudinal supports or roof supports. A third support 110 may be a generally horizontal element or support component of the frame 102. The third supports 110 or longitudinal supports may extend in a fore-aft direction. The third supports 110 may be attached to and/or supported at, on, or by first supports 106 via one or more fasteners. The third supports 110 may be attached to top surfaces 105 of the first supports 106. However, in some configurations, the third supports 110 may be attached to the opposing bottom surfaces of the first supports 106 or to a region between the top and bottom of the first supports 106.

The one or more pillars 104 and/or supports 106, 108, 110 may include one or more slots, openings, holes, bores, recesses, projections, hooks, magnets, or other connecting features for attaching the pillars, accessories, panels, etc. together.

The one or more pillars or supports may include slots, bores, or other features for adjusting the size of the frame or apparatus, so that the size and shape of the frame or apparatus can be customized or changed for various vehicle sizes and configurations. For example, one or more of the pillars and/or supports may have a length that can change (i.e., by having telescoping, folding, bending, pivoting, expanding features) that will allow the frame or apparatus to take on various shapes and sizes to accommodate various vehicle sizes and configurations. For example, the supports 108 and/or 110 may be telescoping or foldable, which may allow for the supports to be extended to accommodate a longer vehicle bed or cargo area or may be retracted or folded to accommodate a shorter vehicle bed or cargo area. In some configurations, one or more supports or pillars can be joined together to make a larger support or pillar. For example, two or more supports 108 can be joined together in an end or end or overlapping formation to extend the length of the support 108 to make the frame or apparatus longer. This longer frame may be suitable for a long bed vehicle or even trailer. Similarly, two or more pillars 104 can be joined together in an end or end or overlapping formation to extend the height of the pillars to make the frame or apparatus taller. One or more of the pillars or supports may nest together to allow the frame to change sizes. For example, one or more of any of the pillars and/or supports may have a U-shaped cross section, like the support 106 illustrated at FIG. 5, which has the downwardly turned flange portions 107. A similar support with a slightly larger or smaller U-shaped cross section may nest with the illustrated U-shaped cross section of support 106, which may allow the length or size of the support to be made longer (to accommodate a wider frame) or nested together and overlap to make a narrower frame or apparatus. Alternatively, the cross section of one or more of the supports or pillars may be square so that one fits into another, which would allow for the overall length of the respective support or pillar to be made longer by retracting one of the supports out of the other support, or the support may be made shorter or smaller by inserting one of the supports into the other. Against, this may be useful for having one or only a few frame configurations that can fit a variety of vehicle sizes and configurations. Of course, there may be a need to have specific panels to fix the custom size of the frame that is made with the adjustable supports or pillars. On the other hand, if the panel is made of a tarp or fabric material, the panel can be cut or folded or stretched, to size.

While the aforementioned description of the frame 102 suggests the pillars and supports are generally linear elements that extend in either a cross-car direction or a fore-aft direction, it is understood that one or more elements of the frame 102, the pillars, or the supports, may extend at an angle or may even have a curved extension. For example, a support may extend at an angle between an upper left corner of the frame 102 to a lower left corner of the frame 102, between an upper right corner of the frame 102 to a lower right corner of the frame 102; from a front right corner of the frame 102 to a rear left corner of the frame 102; etc. Such angled supports or pillars may provide additional strength/structure to the frame 102, styling aesthetics, and/or functional attachment points for attaching panels 112, accessories, and/or equipment. That is, the elements or members of the frame 102 may be used to attach or support various accessories, such as a ladder, spare tire, fire extinguisher, gas cans, tools, firearms, sporting equipment, and the like. The frame 102 may also be used for attaching, securing, and/or supporting one or more panels 112 to the apparatus 100.

One or more of the pillars and various supports may be made from a suitable material such as metal, aluminum, carbon fiber, plastic, a composite material, or a combination thereof. The one or more pillars and various supports may be made via a suitable manufacturing process, such as injection molding, stamping, extrusion, printing, 3D printing, casting, etc.

One or more of the pillars and/or supports may be omitted, duplicated, substituted by another pillar or support, modified, repositioned, repurposed, or a combination thereof. Such modification may be necessitated or desired to increase rigidity or strength of the frame or apparatus, increase aesthetics, reduce weight of the apparatus of frame, reduce assembly complexity and time, reduce the number of parts of the frame or apparatus assembly, or a combination thereof. For example, Referring to FIGS. 1, 4, 5, and 7, the apparatus may include one or more panels 112. The one or more panels 112 may be supported at, on, or by, or may be attached to the frame 102 or to one or more pillars, supports, or other elements of the frame 102. Additionally, or alternatively, the one or more panels 112 may be supported at, on, or by, or may be attached to one or more walls defining the cargo area 12 of the vehicle 10. Additionally, or alternatively, the one or more panels 112 may be supported at, on, or by, or may be attached to one or more other panels 112 of the apparatus 100. The one or more panels 112 may be secured to one another and/or to the frame 102 via one or more fasteners (screws, bolts, clips, prongs, screws, rivets, barbs, quick connects, twist fasteners, magnets, etc.) and/or securing members discussed further below. The one or more panels may be attached to one or more pillars 104, one or more supports 108, or any other supports disclosed herein.

Referring specifically to FIG. 7, if a user desires to attach a pillar 104 to an outside of the frame 102 (i.e., pillar 104a), then the corresponding side panel 114a should be removed or detached from the frame 102 or supports 108 first to provide room and attachment for the pillar 104a to the frame 102 or support. On the other hand, if the pillar 104 is to be attached to an inside of the frame 102 (i.e., 104b), then the corresponding panel 104b may be attached to the frame 102 and/or supports. However, in some configurations, the panels 104a, 104b may be attached to the frame 102 even with the corresponding pillars 104a, 104b attached to an outside surface of the frame 102.

In some configurations, one or more of the panels 112 may be attached to the inside surface of the frame 102 or supports. That is, rather than the one or more panels 112 being attached to the outside surface, like shown in FIG. 7 (i.e., panel 114b), the panel may be attached to the inside surface of the frame 102 (i.e., to the side of the frame 102 where pillar 104b is attached in FIG. 7)

The panels 112 may generally include: opposing side panels 114a, 114b (driver side and passenger side respectively), one or more quarter panels 116a, 116b (front and rear, respectively), a rear panel 118, a top panel 120 or roof, and a front panel 122, which may be adjacent to the front wall 18 of the cargo area 12 and/or the passenger cab 14.

One or more of the panels 112 may be combined with one or more other panels 112 to form a single panel. For example, a quarter panel 116a may be combined with a side panel 114a; the top panel 120 may be combined with a side panel; the front panel may be combined with a top panel and/or quarter panel, etc. One or more of the panels 112 may be separated into two or more discrete panels. For example, the side panel 114a may be separated into a front side panel and a rear side panel, together defining the side panel 114a illustrated in the figures. For example, the side panel 114a may include a frame 124 and a window 126 that may be separated from one another; e.g., See FIG. 4). The window 126 may be moveable (slidable, tiltable, foldable, removable, relative to the frame 124 and/or frame 102, to provide air or access to the inside of the cargo area. The one or more panels 112 may be made of a rigid material (i.e., plastic, carbon fiber, metal, aluminum, fiberglass, etc.). The one or more panels 112 may be made of or include a fabric, vinyl, plastic, tarp, or canvas material. The one or more panels 112 may be transparent or translucent. The one or more panels 112 may be solid and non-transparent or non-translucent. The one or more panels 112 may be painted to match the color of the vehicle 10. The one or more panels 112 may a different color than the vehicle. The one or more panels may be formed via a suitable process, such as molding, injection molding, stamping, printing, 3D printing, and/or the like.

The apparatus 100 disclosed herein may be modular. Modular means that the one or more panels 112 (i.e., panels 114a, 114b, 116a, 116b, 118, 120, 122) may be removably attached or supported at, on, or by other panels 112 and/or to the frame 102 and/or to one or more pillars or supports or elements of the frame 102. This means that one or more of the pillars 104a,b or supports 106, 108, 110 or elements of the frame 102 may be removably attached or supported at, on, or by other panels 112 and/or to one or more pillars or supports or elements of the frame 102. This may provide the user or owner of the apparatus 100 or vehicle 10 ability to customize the look, style, and/or functionality of the apparatus 100.

For example, a user may wish to remove some or all of the panels 112 from the apparatus 100, to achieve an open cargo area, like the one illustrated in FIG. 2. Other users may wish to attach all panels 112 to the frame 102 to achieve an enclosed cargo area 12 to keep fluids and/or debris from entering the cargo area 12, like the one illustrated in FIG. 1. In some configurations, a user may wish to remove some of the panels 112, such as the side and quarter panels, but keep other panels, such as the top roof panel 120. In some configurations like illustrated in FIG. 7, a user may with to keep one of the panels 114b installed at the passenger side but remove the other panel (what would be 114a) on the driver side). In this configuration of FIG. 7, the roof panel is also removed, but of course may be retained. In the configuration of FIG. 7, the rear panel 118 is retained. However, in other configurations, the rear panel 118 may be removed, like shown in FIG. 2.

By removing some of the panels 112, certain elements of the frame 102 may be exposed, which may allow a user to attach or hang certain goods or accessories to the frame 102 or apparatus 100, such a kayak, lumber, a ladder, spare tire, fire extinguisher, gas can, tool, firearms, sporting equipment, bicycle, and the like. One or more of the panels 112 may also have a provision, ability, functionality, and/or structure to attach or hold one or more of the accessories goods directly to the panels 112 as well. For example, the roof panel and/or the rear panel and/or the side panels may include features for holding or securing one or more accessories, like those described above. The interior of the one or more panels 112, pillars, supports, or elements of the frame may also be outfitted with means to support or hang the one or more aforementioned accessories or goods. For example, the one or more panels 112, pillars, supports, or elements of the frame may have one or more hooks, hangers, openings, clamps, clasps, chords, screws, bores, tie down locations, straps, magnets, for holding or securing the one or more aforementioned goods or accessories.

With continued reference to FIG. 7, one or more of the panels 112 may be attached to the frame 102 via one or more lift supports 192. The one or more lift supports 192 may be a shock, spring, gas shock, or the like that may assist with moving, repositioning, or maintaining a panel 112 in an open or closed position.

Figure 4:
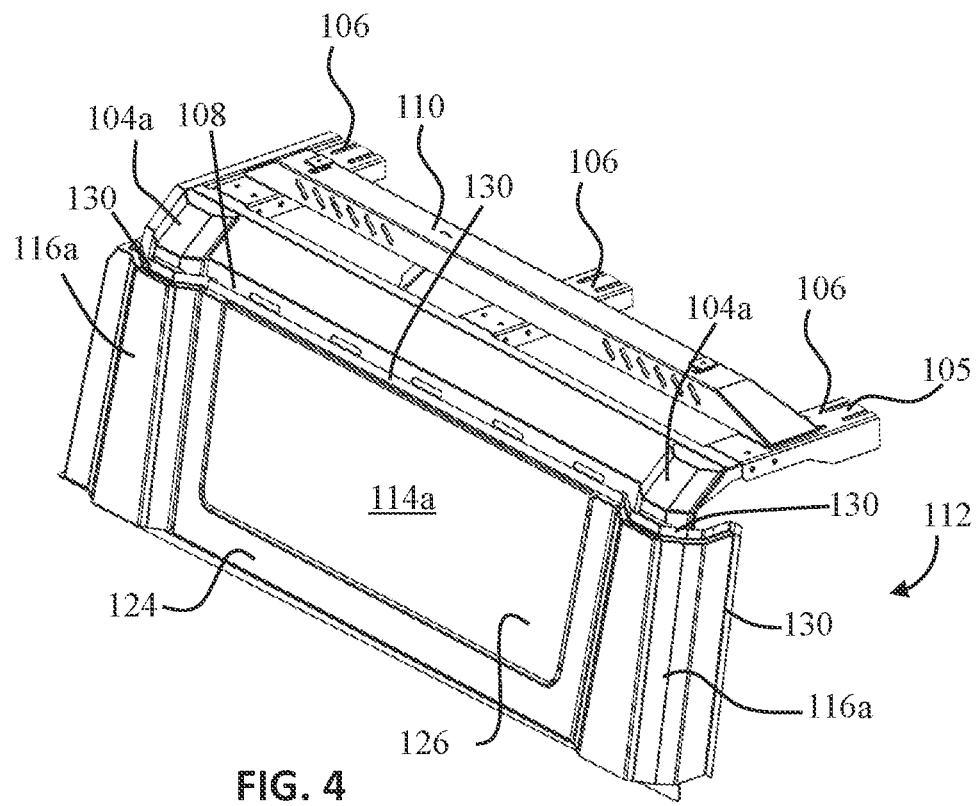
FIG. 4 is a partial perspective view of the frame and panels attached to the frame.
Figure 5:
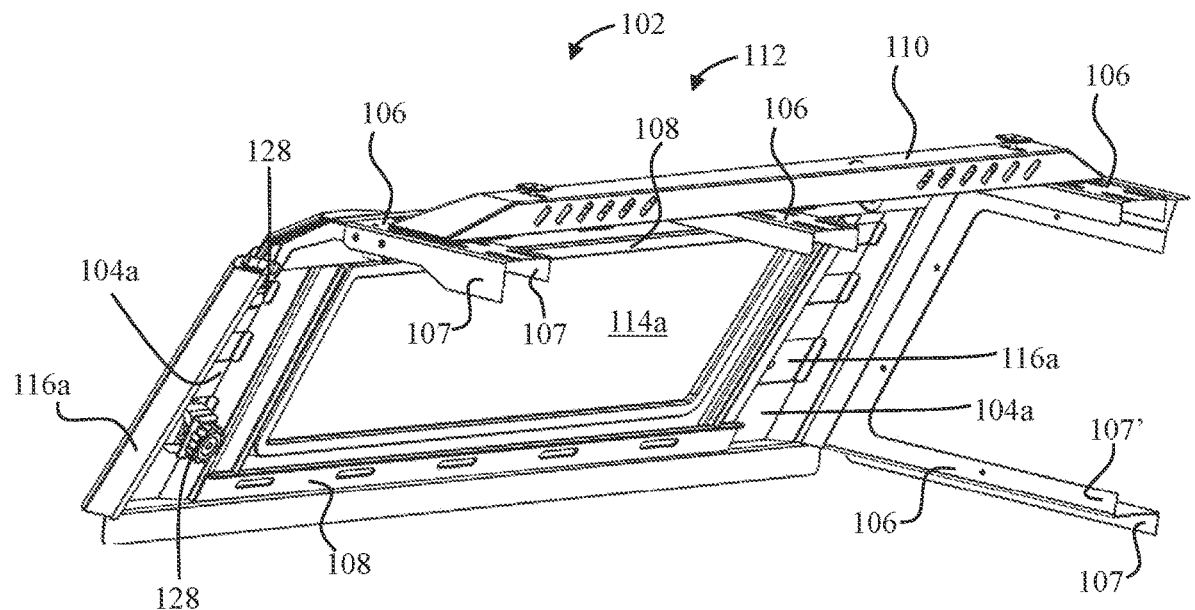
FIG. 5 is a partial perspective view of the frame and panels attached to the frame.

Referring to FIGS. 4, 9A and 9B, one or more of the panels 112 may include a lip 130. The lip 130 may be a portion of a panel 112 that is configured to be at least partially covered by or overlaid by another panel 112 or element of the apparatus 100. As perhaps best shown in FIGS. 9A, 9B, the lip 130 may have a thinner material cross section than the rest of the panel 112. However, in certain configurations, the lip 130 and the rest of the panel 112 may have the same cross section or thickness. The lip 130 may be offset or located in a different plane than an adjacent portion of the panel 112. In FIGS. 9A and 9B, the top or roof panel 120 shingles or overhangs or overlaps the quarter panels 116a, 116b and/or side panels 114a, 114b or more specifically shingles or overhangs or overlaps the lip 130 of the aforementioned panels.

The lip 130 may be an extension of a panel 112. The lip 130 may extend only partially, or entirely, around a perimeter of a panel 112. In some configurations, the lip 130 may extend in only areas where the lip 130 is covered by another panel 112. For example, referring to FIGS. 9A and 9B, the lip 130 of quarter panels 116a, 116b is covered or overlapped by the top panel 120. The top panel 120 may also be referred to herein as a roof panel. The quarter panels 116a, 116b may also have a lip in the region where the quarter panel 116a, 116b meets the side panel 114a,b, or vice versa (i.e., the side panels 114a, 114b may have a lip 130 that is covered by or overhung by the quarter panel 116a, 116b). Covering the lip 130 by an adjacent panel or element of the frame may restrict or prevent fluid and/or debris from flowing or getting behind the panel 112 and/or into the cargo area 12. The lip 130 may also reduce, eliminate, or close out gaps between adjacent panels 112, which may increase or improve aesthetic look of the apparatus 100.

In some configurations, the lip 130 may be or may include a gasket, seal, and/or compressible member to restrict or prevent wind, fluid, and/or debris from getting behind a panel 112/or into the cargo area 12. Such a lip configuration may advantageously reduce noise and vibrations that may occur when two panels 112 are in close contact with one another, that may be generated during vehicle operation.

The lip 130 may also be used to secure or connect one or more panels together and/or to the frame. For example, the lip 130 may include one or more openings or bores for a fastener to pass through to secure the panel 130 to another panel and/or to the frame or element of the frame. For example, the lip may include a hook and loop fastener, a double-sided tape, a pressure sensitive tape, magnets, etc. for securing adjacent panels to one another and/or to the frame.

Figure 10:
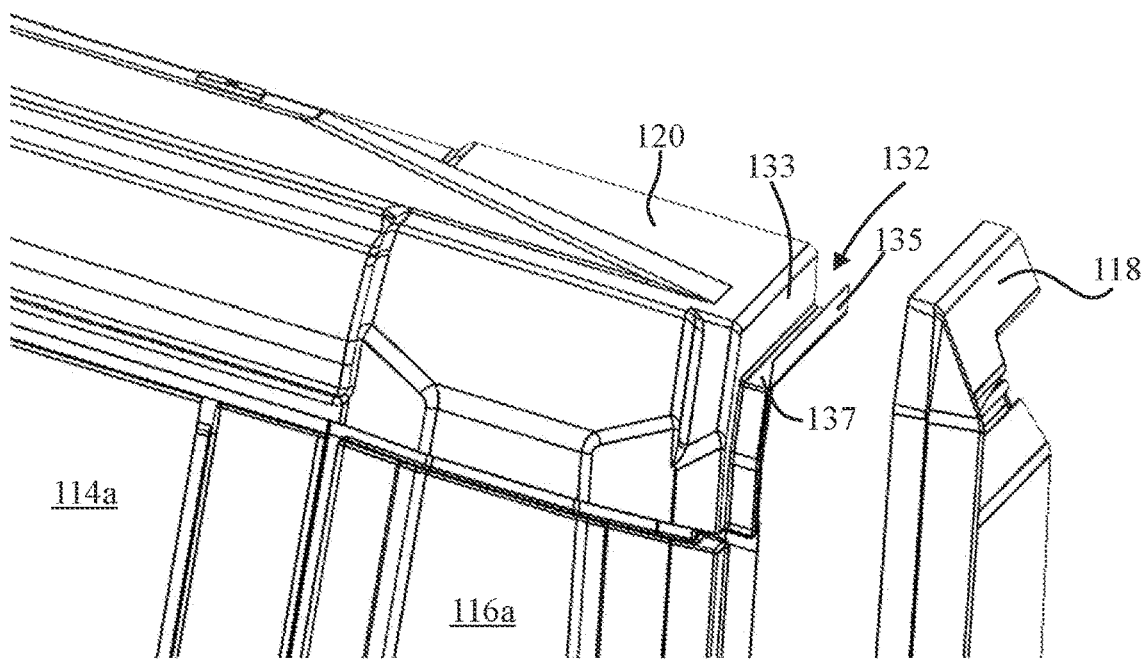
FIG. 10 is a partially exploded, perspective view showing the top panel, side panel, quarter panel, and rear panel.
Figure 11:
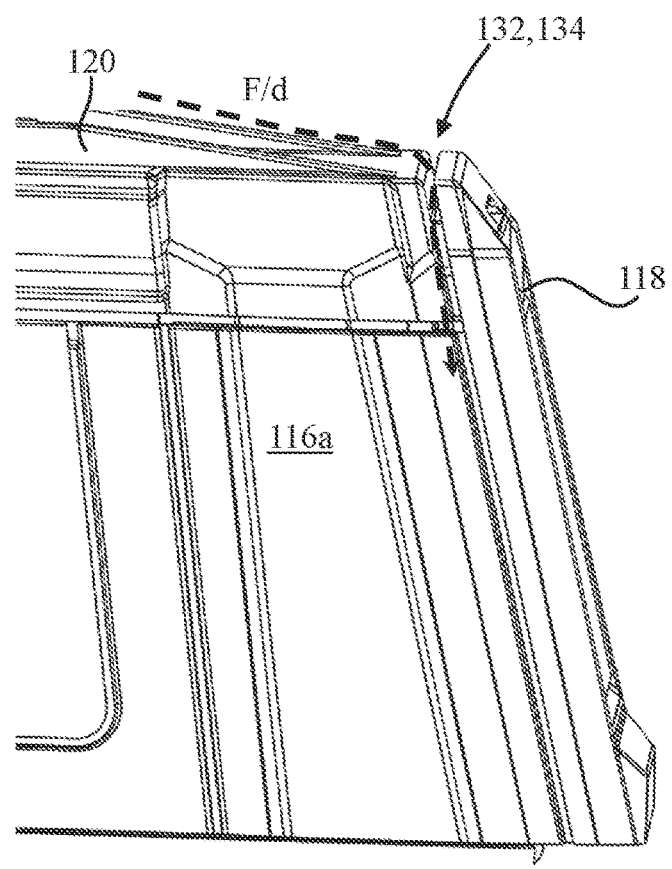
FIG. 11 is a partial perspective view showing the top panel, side panel, quarter panel, and rear panel.

FIGS. 10 and 11 illustrate the top panel 120, side panel 114a, quarter panel 116a, and the rear panel 118. The top panel 120 includes a drain channel 132. The drain channel 132 may function to collect and then divert fluid and/or debris F/d. The drain channel 132 may collect fluid and/or debris F/d that may roll or flow off a rear end of the top panel 120. In other words, rather than rolling off the rear panel 120, fluid and/or debris may fall into the drain channel 132 and then egress from the drain channel 132 to a side of the apparatus 100 (driver or passenger side). After the rear panel 118 is installed onto the apparatus 100, the drain channel 132 may be at least partially covered by the rear panel 118. A gap or slot 134 may still available between the panels 118, 120 to collect fluid and/or debris F/d, as can be seen in FIG. 8. The drain channel 132 may comprise a U or V shaped channel or slot. The drain channel 132 may comprise a forward upright wall 133, a rearward upright wall 135, and a horizontal or sloped floor 137 in-between. One or more holes may be provided in the walls 133, 135 and/or floor 137 to egress fluid from the channel 132. One or more tubes or hoses may be attached to one or more of the aforementioned holes to direct fluid and/or debris away from the cargo area. The floor 137 may be part of a lip 130 discussed above.

Figure 12:
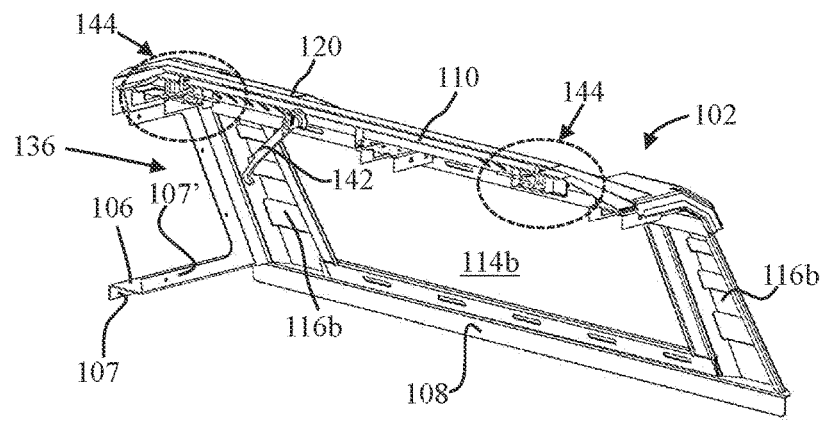
FIG. 12 is a partial perspective view of the frame.

FIG. 12 shows a section of the apparatus 100, when viewed from the inside. More specifically, a portion of the top panel 120, side panel 114*b*, and quarter panels 116*b* is illustrated. This may be the passenger side view of the apparatus 100. FIG. 12 also shows elements of the frame 102, discussed above. The apparatus 100 comprises a lifting mechanism 136. The lifting mechanism 136 may function to lift, move, lower, or otherwise reposition the top panel 120 relative to the frame 102, one or more panels 112 of the apparatus 102, or one or more elements of the apparatus 100.

Figure 13:
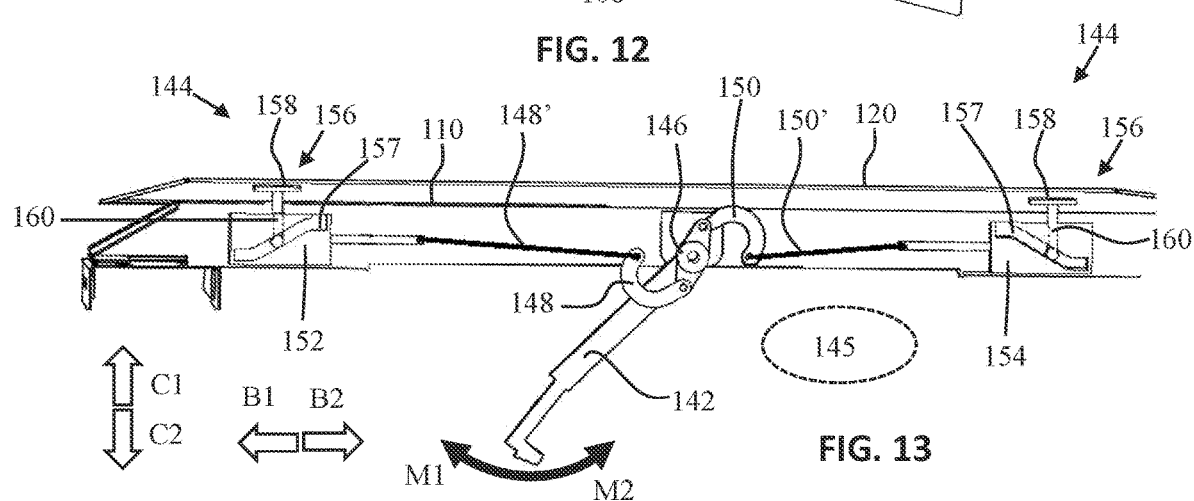
FIG. 13 is a side view showing the lifting mechanism.
Figure 14:
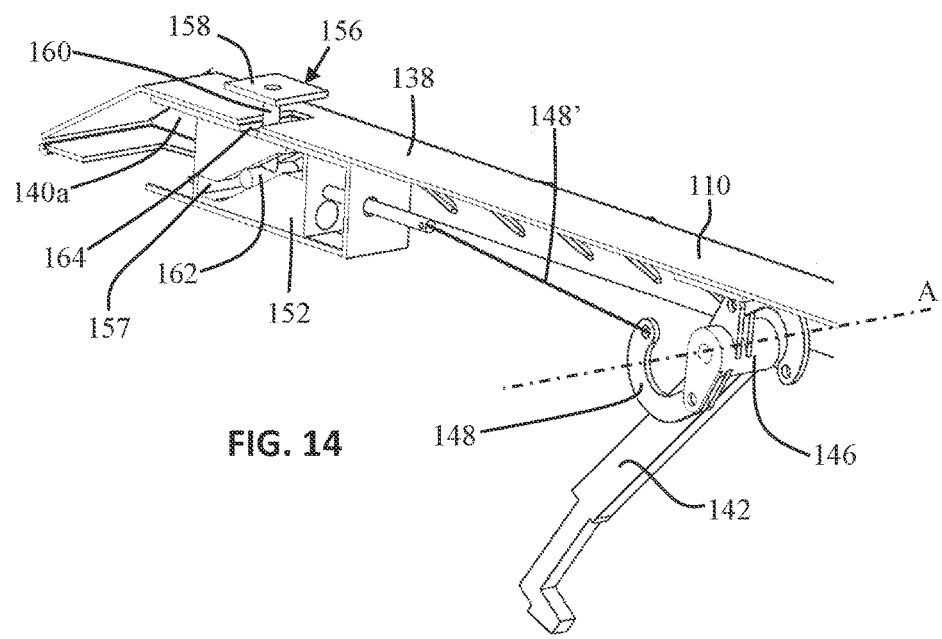
FIG. 14 is a partial perspective view showing the lifting mechanism.

With additional reference to FIGS. 13 and 14, the lifting mechanism 136 may be attached to or supported on, by, or at one the frame 100. More specifically, the lifting mechanism 136 may be attached to or supported on, by, or at one or more of the supports such as the third or roof supports 110 of the frame. Even more specifically, the lifting mechanism 136 may be at least partially supported within the walls defining one of the roof supports 110. Even more specifically yet, one or more of the roof supports 110 may have C- or U-shaped cross section, defined by a top wall 138, two opposing side walls 140*a*, and having an at least partially open bottom. In some configurations, the at least partially open bottom may be covered by another panel or element or the roof support 110 have an enclosed box structure to secure the lifting mechanism from potential damage and/or to achieve an enclosed clean look.

The lifting mechanism 136 may comprise an actuator 142. The actuator 142 may be connected to one or more lifting parts 144. The actuator 142 may be a handle. The lifting mechanism 136 may include one or more elements between the actuator 142 and the one or more lifting parts 144. For example, the lifting mechanism 136 may include on or more cams, links, bars, cables, screws, springs. The lifting mechanism 136 may include a rotary part 146 and one or more links 148, 148' and 150, 150'.

The actuator or handle 142 may be moved, pivoted, rotated, or otherwise repositioned in a movement direction. Movement direction may be a linear movement, a rotational movement, a pivoting movement, or a combination thereof. The movement between directions M1 and M2 may be accomplished manually (i.e., by an operator directly or indirectly moving the handle 142), mechanically, electro-mechanically, automatically, etc. via a motor, actuator, piston-cylinder, etc. An electro-mechanical assembly, which may include one or more motors, actuators, piston-cylinder assemblies, etc. is illustrated schematically at 145. The movement direction M1, M2 in FIG. 10 is a rotational or pivoting movement. The movement direction M1, M2 may be clockwise and counterclockwise.

The actuator 142 is connected to the rotary part 146. The rotary part 146 may be a bell crank. Movement of the actuator 142 in direction M1, M2 causes the rotary part 146 to move, rotate, or pivot in the same direction M1, M2 or a similar direction. The actuator 142 and the rotary part 146 may pivot or rotate about axis A. Axis A may extend in a cross-car direction, for example. However, the mechanism 136 may be rotated or repositioned such that the axis A extends in a fore-aft direction, or in an angled direction between cross-car and fore-aft.

Referring to FIG. 13, movement of the rotary part 146 causes the one or more links 148, 148' to move. That is, movement of the actuator 142 and rotary part 146 in the M1 direction (clockwise), will cause the links 148, 148' to move in the B1 direction. Movement of the actuator 142 and rotary part 146 in the M2 direction (counterclockwise), will cause the links 148, 148' to move in the B2 direction.

Movement of the actuator 142 and rotary part 146 in the M1 direction (clockwise), will cause the links 150, 150' to move in the B2 direction. Movement of the actuator 142 and rotary part 146 in the M2 direction (counterclockwise), will cause the links 150, 150' to move in the B1 direction.

The links 148, 148' and 150, 150' may be connected to a respective track 152, 154. A track 152, 154 may be a moveable member that comprises a sloped or included slot 157 into which a connecting member 162 described further below is received. Movement of the links 148, 148' and 150, 150' causes the respective track 152, 154 to move. For example, movement of the links 148, 148' in the B1 direction, will cause the track 152 to move in the B1 direction. Movement of the links 148, 148' in the B2 direction, will cause the track 152 to move in the B2 direction. Movement of the links 150, 150' in the B1 direction, will cause the track 154 to move in the B1 direction. Movement of the links 150, 150' in the B2 direction, will cause the track 154 to move in the B2 direction.

The lifting mechanism 136 comprises a lifter 156. Each lifter 156 comprises a lifting portion 158, a shaft 160 connected to the lifting portion 158, and a connecting member 162 connecting the shaft 160 to each slot 157 of the track 152, 154. The shaft 160 and the lifting portion 158 extend through an opening 164 defined in the top wall 138 of the roof support 110. Movement of the track 152, 154, causes the lifter 156 to move up and down in the C1 and C2 directions, respectively. For example, movement of the track 152 in the left direction B1, moves or pushes the connecting member 162, shaft 160, and lifting portion 158 in an up direction C1. Movement of the track 152 in the right direction B2, moves or pulls the connecting member 162, shaft 160, and lifting portion 158 in a downwards direction C2. Movement of the track 154 in the left direction B1, moves or pulls the connecting member 162, shaft 160, and lifting portion 158 in a downwards direction C2. Movement of the track 154 in the right direction B2, moves or pushes the connecting member 162, shaft 160, and lifting portion 158 in an upwards direction C1.

The lifting portion 158 may be attached or fixed to the top panel 120. The lifting mechanism 158 may be permanently attached to the top panel 120 (via welding, bolts, screws, etc. The lifting mechanism 158 may fit into a pocket or slot of the top panel 120, which may allow for the top panel to be easily removed from the apparatus, as desired. When the lifter 156 is moved in the up C1 direction, the lifting portion 158 push or move the top panel 120 in the up direction C1. When the lifter 156 is moved in the down C2 direction, the lifting portion 158 draws or pulls the top panel 120 in the down direction C1. Alternatively, when the lifter 156 is moved in the down C2 direction, the top panel 120 may move in the down direction C1 on its own, due to gravity.

The lifting mechanism 136 allows the top panel 120 to be moved in an up and down direction C1, C2. The top or roof panel 120 may be moved between an upper position and a lower position. Referring back to FIG. 1, when the apparatus 100 is installed on the vehicle 10 and the panels 112 are attached to the frame 102, the top panel 120 should be first removed or at least partially raised from the lower position to the upper position via the lifting mechanism 136 before the side panels 114*a,b* and quarter panels 116*a,b* can be removed. This is because the top panel 120 overlaps, hangs over, or shingles over the side panels 114*a,b* and quarter panels 116*a,b*. See for example, FIGS. 9A, 9B, where the top panel 120 is in the lowered position and overlaps or over hangs or shingles over the lip 130 of the side panels 114*a,b* and quarter panels 116*a,b*. After the panels 112 are removed, the roof panel 120 may be lowered back down into the lowered position or onto the frame 102 via the lifting mechanism 136

Referring back to FIGS. 10 and 11, because the rear panel 118 at least partially overlaps or overhangs the top panel 120 (i.e., the rear panel 118 overlaps the drain channel 132, the rear panel 118 may be removed before the top panel 120 is removed or raised via the lifting mechanism 136. Otherwise, the top panel 120 may be jammed. However, in some configurations, the height or distance that the top panel 120 must be moved in an up direction to clear the lip 130 of the side panels 114*a,b* and/or quarter panels 116*a,b* may be less than the distance defined between the walls of the drain channel 132 and the rear panel 118, which would allow the top panel 120 to be moved in an up direction, while the rear panel 118 remains attached.

Figure 15:
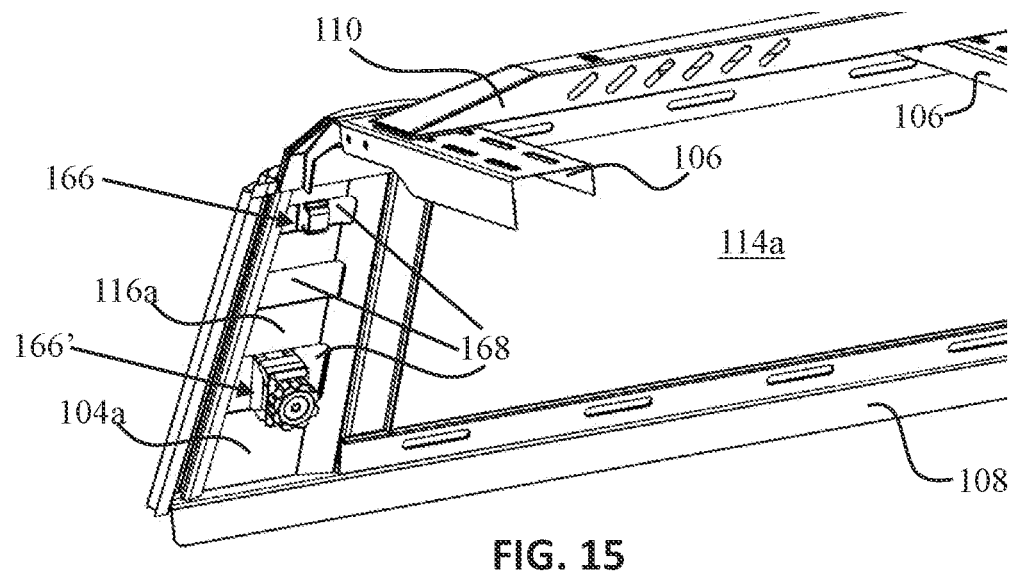
FIG. 15 is a partial perspective view showing the securing mechanism engaging the frame to connect a panel to the frame.

FIG. 15 shows a section of the apparatus 100, when viewed from the inside. This may be the driver side of the apparatus 100. The side panel 114*a* and quarter panels 116*a* are attached to the frame or pillar 104*a*. FIG. 15 also shows elements of the frame 102, discussed above. The apparatus comprises one or more securing mechanisms 166, 166' for attaching or securing the panels 112 to the frame 102.

The securing mechanism 166 in FIG. 15 may extend from a back or B-side of the panel 116*a*. The securing mechanism 166 may have one or more securing legs 174 for attaching or connecting the securing mechanism 166 to the back side of the panel 112.

The securing mechanism 166 comprises one or more flexible or resilient legs 168 (two illustrated) that function to engage an edge 170 of an opening 172 defined in the frame or pillar 104*a*. The legs 168 are flexible or resilient and are configured to flex or bend as the securing mechanism 166 is inserted into the opening 172 from the outside of the apparatus 100 to the inside. The legs 168 may bend or compress while passing through the opening and then spring outwardly or un compress after the legs pass through the opening 172 to secure or attach the panel 112 to the frame 12.

To remove the panel 112 from the frame 102, a user may press, bend, or compress the legs 168 downwardly to allow the securing mechanism 166 to pass or fit through the opening 168 and to allow removal of the securing mechanism 166 and separation of the panel 112 from the frame.

Figure 16:
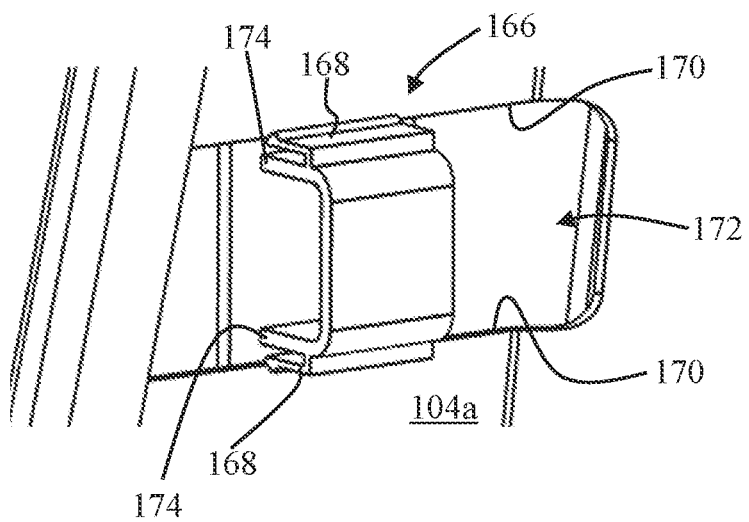
FIG. 16 is a perspective view showing the securing mechanism engaging the frame to connect a panel to the frame.
Figure 17:
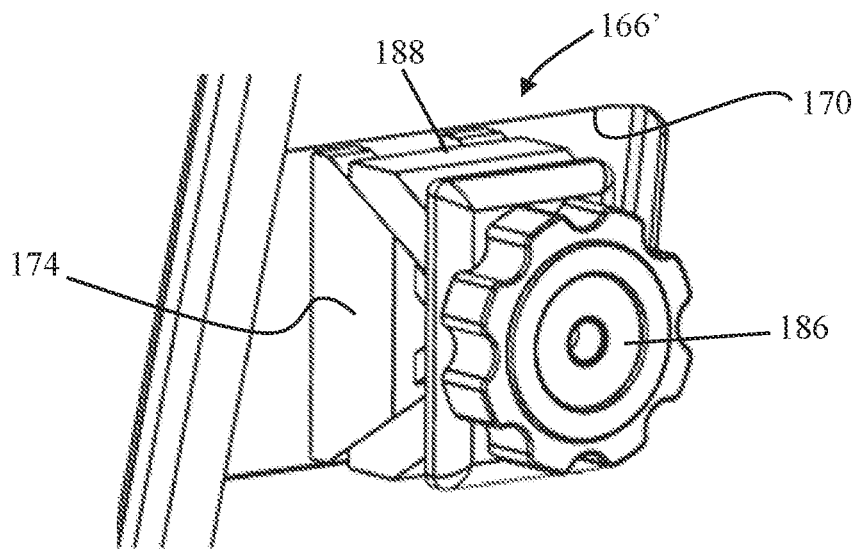
FIG. 17 is a perspective view showing the securing mechanism engaging the frame to connect a panel to the frame.
Figure 18:
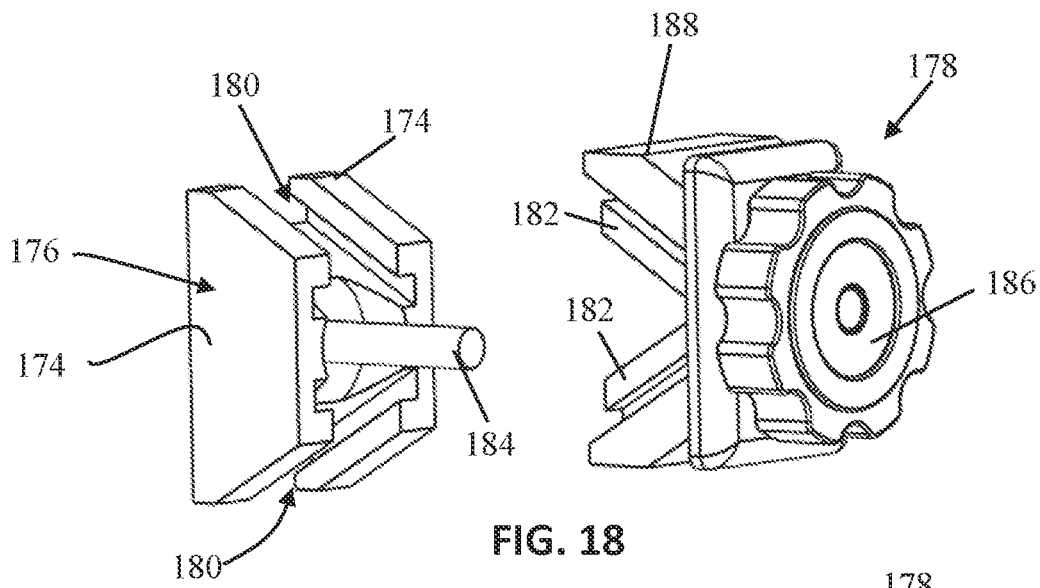
FIG. 18 is an exploded view of the securing mechanism of FIG. 17.
Figure 19:
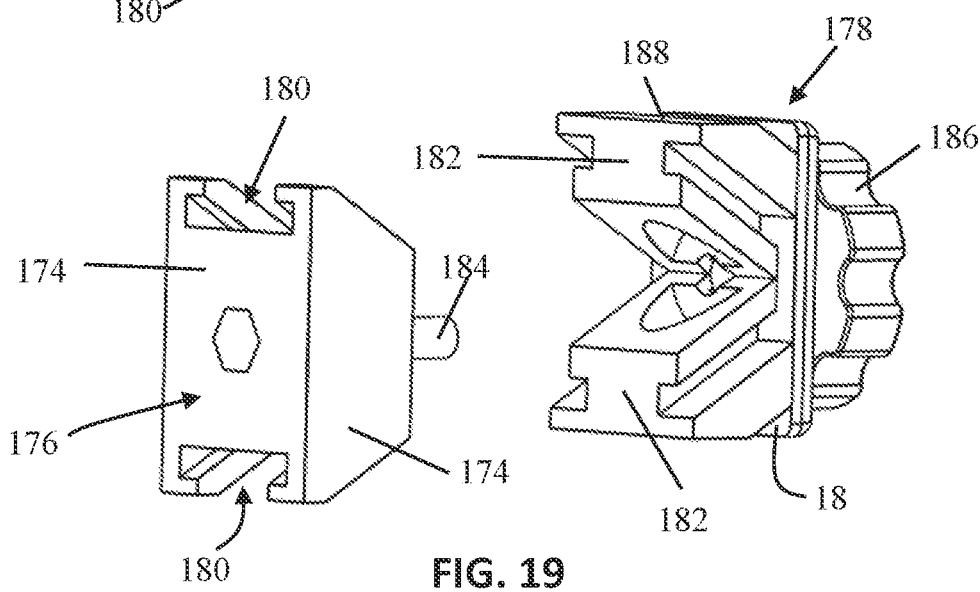
FIG. 19 is an exploded view of the securing mechanism of FIG. 17.

Another securing mechanism 166' is illustrated at FIGS. 17-19. Like the securing mechanism 166 illustrated in FIG. 16 and described above, the securing mechanism 166' of FIGS. 17-19 is also configured to attach a panel 112 to the frame 112 via an opening 164.

The securing mechanism 166' extends from a back or B-side of the panel 116*a*. The securing mechanism 166' may have a securing leg 174 for attaching or connecting a first portion 176 of the securing mechanism 166 to the back side of the panel 112. The securing mechanism 166' has a second portion 178 that mates with the first portion to secure or attach the panel 112 to the frame 102.

The first portion 176 has a pair of opposing grooves 180 arranged at an angle or on a ramp that are configured to mate with corresponding projections 182 arranged at an angle or on a ramp on the second portion 178.

The first portion 176 has a threaded member 184 that is configured to mate with a corresponding tightening member 186 on the second portion 178.

To attach a panel 112 to the frame 102 using the securing mechanism 166', the first portion 176 of the securing mechanism 166' is inserted or passed through the opening 168 defined in the frame 102 in an orientation such that the threaded member 184 extends into the apparatus 102.

The second portion 176 may then be brought into engagement with the first portion such that the tightening member 186 threads onto the threaded member 184. As the tightening member 186 is rotated, the projections 182 on the second portion 178 engage the grooves 180 on the first portion 176. This allows the two portions 176, 178 to join together. As the tightening member 186 is further tightened, the two portions are brought closer together as the projections 182 further engage into the grooves 180 until the wedge 188 on the first portion 176 and/or the contacts or engages or becomes wedged against the walls or edges defining the opening 172.

Figure 20:
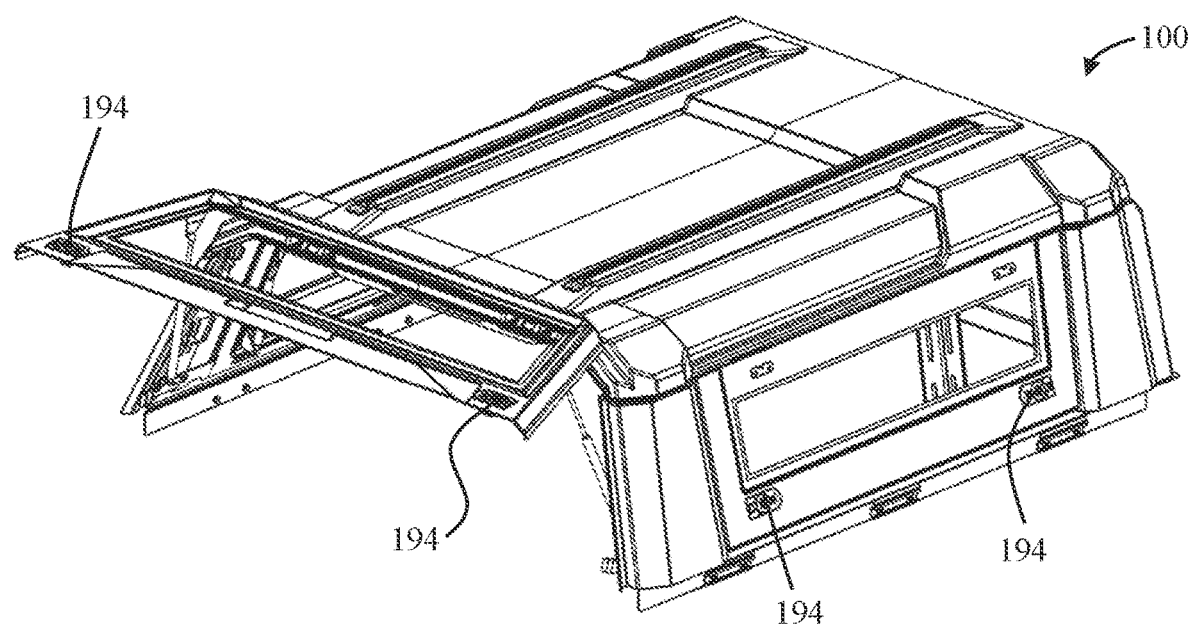
FIG. 20 is a perspective view of the apparatus.

FIG. 20 illustrates the apparatus 100. One or more of the panels 112 may include one or more latches 194. A latch 194 may function to lock and/or unlock the one or more panels 112. For example, locking the latch 194 may restrict or prevent one or more of the panels from being opened or unlocked or removed from the frame 102. In contrast, unlocking the latch 194 may provide for the one or more panels to be opened, moved, repositioned, or removed from the frame 102. The latch 194 may be actuated by physically touching the latch 194, by a key FOB, via a capacitive touch mechanism, via a proximity sensor, thumb print, code, pass code, keypad, cellular telephone, etc. The latch may be unlocked or unlocked automatically when the vehicle doors are unlocked or locked, respectively.

The vehicle may be any vehicle. The vehicle may have a cargo area or bed. The cargo area may be any area or portion of a vehicle that may be used for storing and/or transporting goods or cargo. The cargo area may be any part of the vehicle that has an open top. The cargo area or open top can be at least partially closed or covered by a cover, such as a tonneau cover. The cargo area or open top can be at least partially closed or covered by the apparatus according to these teachings. The cargo area or open top can be at least partially closed or covered by the apparatus according to these teachings with or without a tonneau cover covering the cargo area.

The cargo area may be a cargo box, bed, trunk, storage compartment, or a combination thereof. The cargo area may be located in a front portion of a vehicle, a middle portion of a vehicle, and/or at a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by the vehicle. The cargo area may be part of a pickup truck. The cargo area may be part of an all-terrain vehicle or a utility task vehicle or utility terrain vehicle (UTV).

One or more of the features or elements of the apparatus disclosed and/or illustrated herein may be provided or combined with any suitable cover or apparatus, even though the combination or integration is not illustrated or expressly disclosed herein. Moreover, one or more elements or features of the apparatus disclosed herein may be moved or repositioned into other areas or features of the apparatus without departing from the spirt of this application. One or more features or elements of the apparatus disclosed and/or illustrated herein may be duplicated. One or more features or elements of the apparatus disclosed and/or illustrated herein may be removed or eliminated. One or more features or elements of the apparatus disclosed and/or illustrated herein may be rearranged into other areas or positions of the apparatus depending on various construction of the vehicle and/or cargo area.

The apparatus according to these teachings may be referred to as a cap, a truck cap, a topper, a cover, a rack, an overland rack, an overhead rack, a utility rack, a carrier, a tent, or a combination thereof. The apparatus may be used to at least partially cover the open end of a cargo area of a vehicle.

The apparatus may be modular and/or customizable. This means that the apparatus can be customized according to the needs and/or desires of a user or owner. For example, one or more panels of the apparatus can be removed from the frame. For example, one or more panels of the apparatus can be attached or secured to the frame. This flexibility advantageously allows a user to customize the look and functionality of the apparatus on their vehicle. For example, if carrying or transporting a large article or goods in the cargo area (i.e., a ladder, lumber, surfboard, etc.), a user may wish to remove one or more panels to allow the article or good to project from or through the apparatus. For example, a user may wish to remove one or more panels from the frame to mount or attach one or more items to the frame (i.e., gas can, vehicle jack, ladder, etc.). For example, a user may wish to attach one or more or all panels to the frame, to restrict or prevent dirt, debris, and/or fluids from entering the cargo area and/or prevent theft of goods inside of the cargo area. Moreover, a user may remove one or more pillars or supports from the frame.

The modularity of the apparatus may also have advantageous benefits regarding shipping or transport and storage. For example, traditional truck caps comprise a single construction body or shell that is heavy, bulky, and takes up a large footprint in a storage building or garage. On the other hand, by having ability to disassemble the panels from the frame and remove pillars and/or supports from the frame, the apparatus according to these teachings can be shipped in one or more boxes. Moreover, a user can take the frame and panels apart and store the contents on a shelf. Furthermore, the modularity of this apparatus may allow dealers to offer just the frame for sale, or one or more panels with the frame, rather than the entire apparatus. This may allow users to customize and purchase only the parts they desire.

The apparatus comprises one or more frames. The frame may function to provide the skeleton of the apparatus onto which one or more panels can be installed. The frame may function to carry the load of the panels and/or any items attached to the apparatus.

The frame may comprise one or more elements, which may be referred to as pillars, supports. The one or more elements may be one or more beams, posts, The frame may be a shell or rack or skeleton, onto which one or more panels, accessories can be mounted to or attached.

The frame may include on or more pillars. A pillar may be an upright component of the frame. The one or more pillars may be a generally vertical element or support component of the frame that extends from the bottom to the top of the frame. The one or more pillars may be an angled element or support component of the frame that extends from the bottom to top of the frame. The one or more pillars may be located on the driver side of the vehicle or cargo area, the passenger side of the vehicle or cargo area, the front wall of the cargo area, the tailgate, or a combination thereof. In some configurations, additional supports may extend between adjacent pillars.

The frame may include on or more support. A support may be a generally horizontal element that extends in a cross-car direction (between driver and passenger side). A support may be a generally horizontal element that extends in a fore-aft direction (front to back). A support may extend between or connect one or more other supports, pillars, or other members of the frame. The one or more pillars and/or supports may form a roof of the apparatus, the side walls of the apparatus, the rear of the apparatus, the bottom of the apparatus, or a combination thereof. The one or more supports, pillars, or elements may increase stability of the apparatus, provide for additional mounting points for attaching one or more panels or accessories to the frame, or a combination thereof.

While pillars are used to describe a vertical component of the apparatus and supports are used to describe a horizontal component of the apparatus, pillar and support may be used interchangeably. Moreover, one or more of the pillars and supports may be arranged at an angle between adjacent pillars and supports, to increase stability of the apparatus and/or to provide additional mounting points for panels, accessories, etc.

The one or more pillars, supports, or element of the frame or apparatus may be made from a suitable material, such as aluminum, steel, plastic, composite, polypropylene, nylon, or other strong and lightweight materials. The one or more pillars, supports, or elements may be connected or secured to each other via one or more permanent attachment means (welding) or one or more non-permanent attachment means (bolts, screws, quick connect fasteners, snaps, pins, clips, prongs, magnets, etc.).

The apparatus may include one or more lifting mechanisms. The lifting mechanism may be operated manually, electromechanically, or both. The lifting mechanism may function move, raise, lower, or otherwise reposition the top or roof panel relative to the other panels, frame, or vehicle. In some configurations, the lifting mechanism may be operable to move one or more other panels like the side panel, front panel, quarter panel, rear panel etc.

The lifting mechanism may include one or more gears, springs, ratchets, cranks, bell cranks, motors, links, cables, fasteners, springs, coils, magnets, sensors, screws, actuators. The lifting mechanism may also be referred to as a lowering mechanism, when functioning to lower the top panel into the closed position, where any gaps are closed between the top panel and the side, front, rear, and/or quarter panels.

The lifting mechanism may include a pinch sensor, to prevent the top panel from closing onto the apparatus if an obstruction is detected between the roof panel and the lower panel or frame. The lifting mechanism may include a force sensor, to prevent the top panel from lifting if a load or weight is acting on the roof panel, which may damage the lifting mechanism or roof panel if allowed to lift.

One or more securing mechanisms may be used for connecting one or more panels to one another, to the frame or elements of the frame, to the wall of the cargo area or vehicle or a combination thereof. The one or more securing mechanisms may be one or more screws, bolts, fingers, pliable, biasable or flexible fingers, legs, or wings, magnets, hook and loop fasteners, slots, prongs, clips, undercut regions, or a combination thereof.

The invention claimed is:

1. A utility rack for covering at least a portion of a cargo area of a vehicle, the utility rack comprising:

a frame that includes: one or more lower support bars that are configured to extend at least partially along a length of the cargo area;
one or more upper support bars that are configured to extend at least partially along the length of the cargo area; and
one or more pillars extending between the one or more lower support bars and the upper support bars;
wherein in a first configuration of the frame, the one or more pillars are connected to inner surfaces of the one or more lower support bars and the one or more upper support bars; and in a second configuration, the one or more pillars are connected to outer surfaces of the one or more lower support bars and the one or more upper support bars,
wherein the the utility rack comprises a side panel that is attached to the frame, and the side panel is attachable to the frame only when the frame is in the first configuration.

2. The utility rack according to claim 1, further comprising a roof panel that overlaps or overhangs a portion of the side panel.

3. The utility rack according to claim 2, wherein the roof panel comprises a drain channel that extends in a cross-car direction.

4. The utility rack according to claim 3, further comprising a rear panel that is supported on the frame, wherein the rear panel at least partially overlaps the drain channel.

5. The utility rack according to claim 2, wherein the roof panel is made of a rigid material and the side panel is made of flexile or canvas material.

6. The utility rack according to claim 2, wherein the roof panel is made of a rigid material and the side panel is made of a rigid material.

7. The utility rack according to claim 2, further comprising a lifting mechanism configured to move the roof panel relative to the frame and/or the side panel.

8. The utility rack according to claim 2, further comprising one or more quarter panels.

9. An apparatus for covering at least a portion of a cargo area of a vehicle, the apparatus comprising:
a frame;
one or more side panels attached to the frame;
one or more quarter panels attached to the frame;
a rear panel;
a roof panel supported by the frame; and
a lifting mechanism configured to move the roof panel relative to the frame and/or the one or more side panels, the lifting mechanism comprises a handle, a lifter, and a track supporting the lifter, wherein movement of the handle, causes the track to move in a first direction, which causes the lifter to slide in the track in a second direction to raise and/or lower the lifter, which causes the roof panel to be repositioned,
wherein in a first configuration of the frame, one or more pillar bars are attached to an outside surface of one or more support bars; and in a second configuration of the frame, the one or more pillar bars are attached to an inside surface of the one or more support bars.

10. The apparatus according to claim 9, wherein the one or more side panels, the one or more quarter panels, and/or the roof panel are removable from the frame.

11. The apparatus according to claim 9, wherein the frame comprises one or more pillar bars and one or more support bars, wherein the one or more pillar bars extend in a generally vertical direction and the one or more support bars extend in a generally horizontal direction.

12. The apparatus according to claim 10, wherein the apparatus comprises one or more securing mechanisms for securing the one or more side panels and/or the one or more quarter panels to the frame, wherein the securing mechanism extends from a back side of the one or more side panels and/or the one or more quarter panels, the securing mechanism comprises a first portion and a second portion, the first portion having a pair of opposing grooves that are arranged at an angle or on a ramp and are configured to mate with a pair of corresponding projections arranged at an angle or on a ramp on the second portion.

13. The apparatus according to claim 12, wherein the first portion has a threaded member that is configured to mate with a corresponding tightening member on the second portion.

14. The apparatus according to claim 12, wherein the apparatus comprises one or more securing members for securing the one or more side panels and/or the one or more quarter panels to the frame, wherein the securing mechanism extends from a back side of the one or more side panels and/or the one or more quarter panels, the securing mechanism comprises one or more flexible or resilient legs configured to engage an edge of an opening defined in the frame.

15. The apparatus according to claim 9, wherein the apparatus comprises a bracket for securing the frame to the cargo area of the vehicle.

16. A method of moving the roof panel relative to the frame and/or the one or more side panels of the apparatus according to claim 9, wherein the method comprises moving the handle so that the lifter slides in the track and causes the roof panel to move up or down.

* * * * *